United States Patent
Konanayakam et al.

(10) Patent No.: US 6,989,170 B2
(45) Date of Patent: Jan. 24, 2006

(54) SYSTEM AND METHOD FOR MAKING CASINGLESS SAUSAGE

(75) Inventors: Maiyuran Konanayakam, Irvine, CA (US); Richard W. Jones, Jr., Trenton, MO (US); Jorge K. Succar, Yorba Linda, CA (US)

(73) Assignee: ConAgra Grocery Products Company, Irvine, CA (US)

( * ) Notice: Subject to any disclaimer, the term of this patent is extended or adjusted under 35 U.S.C. 154(b) by 46 days.

(21) Appl. No.: 10/664,516

(22) Filed: Sep. 17, 2003

(65) Prior Publication Data

US 2004/0076736 A1     Apr. 22, 2004

Related U.S. Application Data

(60) Provisional application No. 60/411,417, filed on Sep. 17, 2002.

(51) Int. Cl.
A22C 11/00     (2006.01)
A23B 4/01     (2006.01)

(52) U.S. Cl. .......................... 426/243; 99/353; 99/494; 426/513; 452/30

(58) Field of Classification Search ................ 426/241, 426/243, 513, 516; 99/353, 472, 483, 494; 219/400; 452/30, 50; 425/297, 311, 373
See application file for complete search history.

(56) References Cited

U.S. PATENT DOCUMENTS

| | | |
|---|---|---|
| 3,235,388 A | 2/1966 | Francis |
| 3,713,846 A | 1/1973 | Turner et al. |
| 3,889,013 A | 6/1975 | Moule |
| 4,058,633 A | 11/1977 | Staff et al. |
| 4,280,803 A | 7/1981 | Treharne |
| 4,294,858 A * | 10/1981 | Moule .......................... 426/241 |
| 4,404,229 A | 9/1983 | Treharne |
| 4,989,505 A | 2/1991 | Mally |
| 5,056,425 A | 10/1991 | Mally |
| 5,098,332 A | 3/1992 | Handel |
| 5,115,732 A | 5/1992 | Mally |

(Continued)

FOREIGN PATENT DOCUMENTS

WO     WO 00/76330 A     12/2000

(Continued)

OTHER PUBLICATIONS

Isaksson, Sven, "Electrical Continuous Flow Heating of Meat and Other Foods"; A Literature Review; 2000, pp. 1-14, SIK, The Swedish Institute for Food and Biotechnology, Goteburg.

Primary Examiner—George C. Yeung
(74) Attorney, Agent, or Firm—Bingham McCutchen LLP (57) ABSTRACT

A method and system for producing a casingless sausage product. An emulsion, such as a meat emulsion, is heated by a first heating element, such as conductive element, such as a heat exchanger or a direct heating element, from a first temperature to an initial heating temperature. The initial heating forms a warm emulsion. After the first heating stage, the warmed emulsion is heated again during a second stage with a second heating element from the initial heating temperature to a higher, second heating temperature. Other numbers of heating elements can be utilized as necessary. The second heating element can be a rapid heating element, such as a microwave or radio frequency (RF). The second heating produces a casingless sausage. The casingless sausage is subsequently cooled or chilled to produce the casingless sausage product. The product can be cut to a length and packaged in a container or can.

49 Claims, 5 Drawing Sheets

U.S. PATENT DOCUMENTS

| | | |
|---|---|---|
| 5,118,519 A | 6/1992 | Mally et al. |
| 5,141,762 A | 8/1992 | Mally |
| 5,211,106 A | 5/1993 | Lucke |
| RE35,426 E | 1/1997 | Mally |
| 6,187,362 B1 | 2/2001 | Breu et al. |
| 6,203,832 B1 | 3/2001 | Kramer |
| 6,326,039 B1 | 12/2001 | Schiffmann et al. |
| 6,444,248 B1 | 9/2002 | Franklin et al. |
| 2002/0197368 A1 | 12/2002 | Franklin et al. |
| 2003/0082284 A1 | 5/2003 | Franklin et al. |

FOREIGN PATENT DOCUMENTS

| | | |
|---|---|---|
| WO | WO 01/33978 A1 | 5/2001 |

\* cited by examiner

*Represents continuous heating of emulsion from 40 degrees F to 160 degrees F without using dual stage heating

Large-Scale System

Assuming "X" Pounds of Meat Emulsion, Quantity of Power Required to Prepare Casingless Sausage With a Processing Line

| Meat Emulsion (lbs) to Process Per Hour | Emulsion Temperature | | Sausage Temperature | Power Required (MW) | Reduction In Power (MW) Using Dual Stage Heating |
|---|---|---|---|---|---|
| | FIRST TEMPERATURE AND INITIAL HEATING | | SECOND / FINAL HEATING | | |
| | First Temperature (F) (Prior to Pre-heating) | Initial Heating Temperature (F) (First Stage) | Second Heating Temperature (F) (Second Stage) | | |
| 15,000 | 40 (First)* | | 160 (Final)* | 422* | |
| 15,000 | | 50 | 160 | 387 | 35 |
| 15,000 | | 60 | 160 | 352 | 70 |
| 15,000 | | 70 | 160 | 317 | 106 |
| 15,000 | | 80 | 160 | 282 | 141 |
| 15,000 | | 90 | 160 | 246 | 176 |
| 15,000 | | 100 | 160 | 211 | 211 |

Small-Scale System

Assuming "X" Pounds of Meat Emulsion, Quantity of Power Required to Prepare Casingless Sausage With a Processing Line

| Meat Emulsion (lbs) to Process Per Hour | Emulsion Temperature | | Sausage Temperature | Power Required (MW) | Reduction In Power (MW) Using Dual Stage Heating |
|---|---|---|---|---|---|
| | FIRST TEMPERATURE AND INITIAL HEATING | | SECOND / FINAL HEATING | | |
| | First Temperature (F) (Prior to Pre-heating) | Initial Heating Temperature (F) (First Stage) | Second Heating Temperature (F) (Second Stage) | | |
| 200 | 40 (First)* | | 160 (Final)* | 6* | |
| 200 | | 50 | 160 | 5 | 1 |
| 200 | | 60 | 160 | 5 | 1 |
| 200 | | 70 | 160 | 4 | 2 |
| 200 | | 80 | 160 | 4 | 2 |
| 200 | | 90 | 160 | 3 | 3 |
| 200 | | 100 | 160 | 3 | 3 |

SYSTEM AND METHOD FOR MAKING CASINGLESS SAUSAGE

CROSS-REFERENCE TO RELATED APPLICATION

This application claims priority under 35 U.S.C. §119 to U.S. Provisional Patent Application No. 60/411,417, filed Sep. 17, 2002, the entire disclosure of which is incorporated herein by reference.

BACKGROUND OF THE INVENTION

Prior systems and methods for making sausage, such as canned Vienna sausages and other sausage products, typically involve stuffing a blended meat emulsion or paste into a casing. The meat product and the casing are cooked, typically using smoke house and rapid heating such as boiling, frying or other direct heating methods, such as Ohmic heating and exposure to microwave or radio frequency (RF) energy. The casing is then removed or stripped from the cooked sausage, and the cooked sausage is cut to desired lengths. The cut sausages are packed into cans or other containers, topped with broth or other additives, and sterilized. The canned sausages can then be shipped for sale, storage, or consumption.

Conventional systems and methods for making casingless sausage, however, can be improved. For example, sausages and related meat products should be prepared without the need to utilize a casing or other skin that is stuffed with a food item and then subsequently removed or stripped from the cooked food item. Eliminating casings and the related stuffing and stripping processing steps reduces product costs, simplifies production, and increases production rates. Further, when a sausage or other similar product is heated with conventional rapid heating methods, such as microwave energy, the rapid heating typically hardens the sausage as a result of coagulation of proteins and binding of the emulsion components. The hardened sausage can be more difficult to pump and process, thereby inhibiting efficient sausage production. Moreover, heating a sausage product with only rapid heating techniques can consume significant amounts of energy, thereby further increasing production costs.

A need, therefore, exists for a system and a method for preparing a casingless sausage product in a more time, cost and energy efficient manner, without sacrificing the quality and taste.

SUMMARY OF THE INVENTION

In accordance with one aspect of the present invention is a method for making a casingless sausage product. Initially, meat paste, such as a meat emulsion, is heated by a first heat source or element from a first temperature to an initial heating temperature. Preferably, the first heat source is a heat source other than a rapid heating heat source. After the initial heating, the warmed emulsion is heated a second time from the initial heating temperature to a second heating temperature using a second heat source or element to produce a casingless sausage. The casingless sausage is then cooled to produce the casingless sausage product.

In further accordance with the present invention is a system for making a casingless sausage product from a meat paste, such as a meat emulsion. In one embodiment, the system includes a first heat source, a second heat source, and a chiller. The first heat source preferably does not utilize rapid heating, whereas the second heat source can utilize such heating techniques. The emulsion is initially heated with the first heat source from a first temperature to an initial heating temperature, and then heated again with the second heat source to a second heating temperature to form a casingless sausage. The casingless sausage is cooled to produce the casingless sausage product.

The first heat source or element is preferably a non-rapid heating element. For example the first heating element may be a conductive heat source, such as a heat exchanger. Alternatively, the first heat source can be a direct heating source, such as steam or hot water. In one embodiment, the first heat source initially heats the emulsion from a first temperature to a an initial heating temperature that is preferably less than about 120° F. For example, the first heat source can heat the emulsion from a first temperature of about 40° F. to an initial heating temperature of about 100° F. for a duration from about 5 seconds to about 30 seconds. The second heat source may be a rapid heating heat source, such as a microwave or radio frequency (RF) heat source, or other suitable heating source. The second heat source heats the previously heated emulsion from the initial heating temperature to a second heating temperature, e.g., about 130° F. to about 170° F., for a duration from about 2 seconds to about 60 seconds.

The chiller exposes the casingless sausage to a temperature that is lower than the second heating temperature of the casingless sausage upon exiting the second heat source. Cooling the casingless sausage forms the casingless sausage product. For example, in one embodiment, a chilled brine spray is applied to the casingless sausage as it is transported by a conveyor. The casingless sausage may be cooled down to about 85° F. to 35° F., preferably about 50° F. The casingless sausage can also be exposed to an ambient condition, for example, for about 10 to about 120 seconds.

In further accordance with the invention, a pump provides the emulsion to the first heat source. The size of the emulsion output is controlled by the pump. In one embodiment, the diameter of a tube carrying the emulsion may be reduced from about 4" to about 1", and the emulsion enters the larger end of the tube at about 200 lb/hour and exits the reduced end of the tube at about 180 lb/hour. The size of the previously heated emulsion can also be reduced. For example, the previously heated emulsion can be reduced from about 1" to about 0.5" so that the emulsion enters the larger end of the tube at about 200 lb/hour and exits the smaller end of the tube at about 190 lb/hour.

Also in accordance with the present invention, a cutter can cut the cooled casingless sausage product into individual sausage products or pieces. The individual sausage pieces can have various dimensions and shapes, for example, a cylindrical shaped with a diameter from about 15 mm (0.59") to about 30 mm (1.18") and a length from about of about 1" to about 6". The cut pieces can be packaged or canned.

DETAILED DESCRIPTION OF PREFERRED EMBODIMENTS

In the following description, reference is made to the accompanying drawings which form a part hereof, and which show by way of illustration specific embodiments in which the invention may be practiced. It is to be understood that other embodiments may be utilized as changes may be made without departing from the scope of the present invention.

Figure 1:
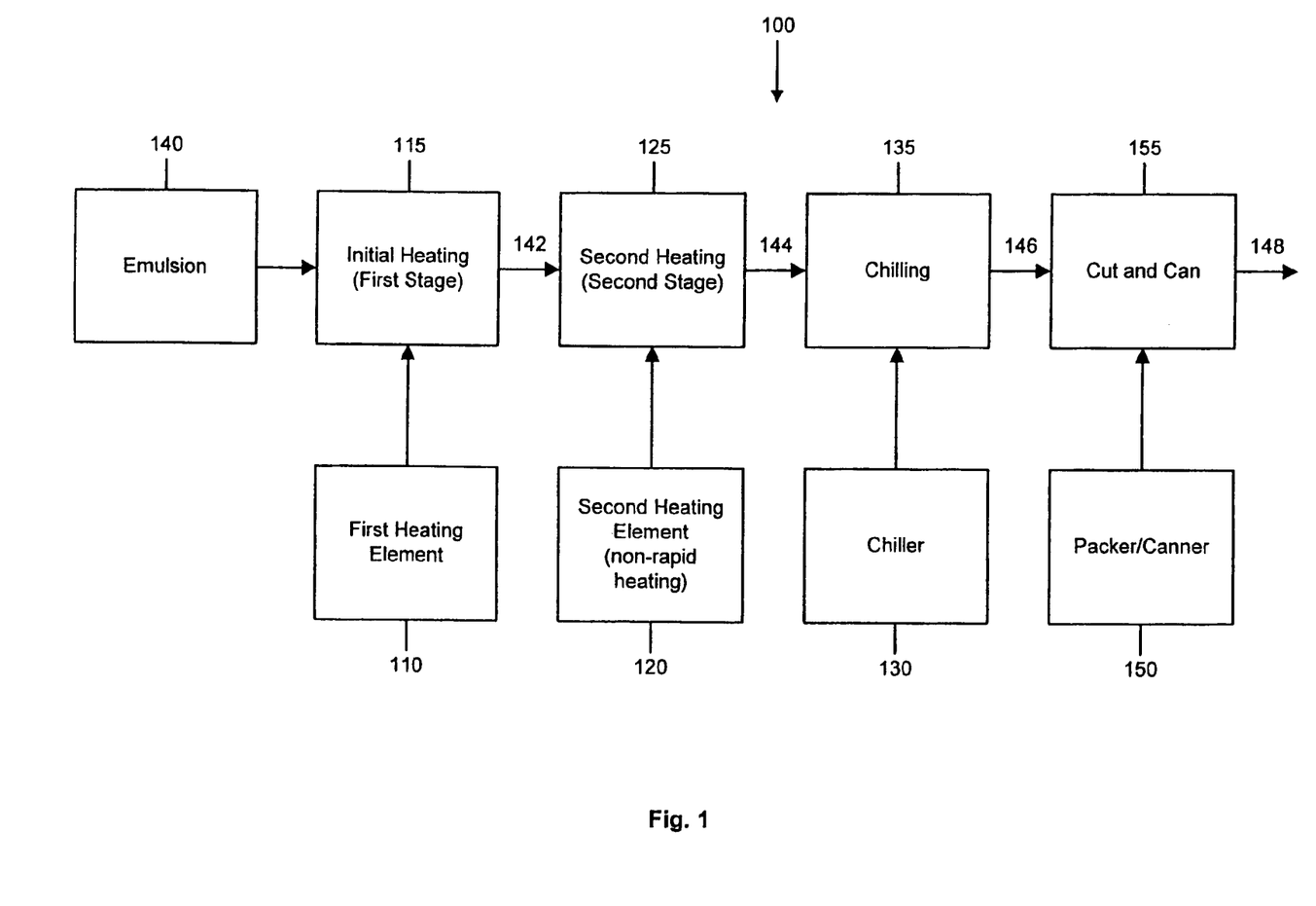
FIG. 1 is a system flow diagram showing a system for producing casingless sausage according to the present invention utilizing first or initial heating, second or subsequent heating, and cooling.

Referring to FIG. 1, the present invention provides a system 100 for producing a casingless sausage product from a meat paste or emulsion. The present invention can be used to produce various food products including casingless sausages (e.g., "Vienna" sausages), protein gel preparations, salami pastes, bologna, and other animal, vegetable, microbial and synthetic protein-based preparations, and various other bio- and synthetic polymer mixtures. These exemplary food products can be produced in different shapes and sizes as needed. This specification, however, refers to a meat emulsion for producing a casingless sausage products, particularly Vienna type sausages, for purposes of explanation and illustration. The invention, however, is not so limited.

In one embodiment, a system 100 according to the present invention may include various numbers of heating elements, such as two heating elements as illustrated, and a cooling system. The present invention may be implemented with different numbers of heating elements that heat an emulsion to various temperatures. For example, in the illustrated embodiment, two heating elements are used to heat an emulsion from a first temperature to a first heating temperature, and then heat the emulsion from the first heating temperature to a second or final heating temperature. In alternative embodiments, the same heating element or one or more additional heating elements (e.g., three, four, five and other numbers of heating elements) can heat the emulsion to one or more intermediate temperatures between the first temperature and the initial heating temperature. The same element or one or more additional heating elements can also heat the emulsion to one or more intermediate temperatures between the initial heating temperature and the final heating temperature. This specification, however, describes and illustrates a system 100 utilizing two-stage or dual-stage heating with two heating elements for purposes of explanation and illustration. The invention, however, is not so limited, and may be configured to process different products at various operating parameters.

One embodiment of the invention includes a first heating element 110, a second heating element 120, and a chiller 130. An emulsion 140 is initially heated 115 with the first heating element 110 from a first temperature, such as a refrigerated or storage temperature, to a higher, initial heating temperature to produce a warmed emulsion or warm paste 142. The emulsion 140, however, preferably is not heated so much that proteins in the emulsion 140 coagulate to harden the emulsion 140. The warmed emulsion 142 then undergoes a second, additional heating 125 with the second heating element 120 from the initial heating temperature to a higher, second heating temperature. As a result of the second heating 125, the warmed emulsion 142 is formed into a hardened paste or casingless sausage 144. The casingless sausage 144 is formed, in part, by proteins in the emulsion hardening and setting as a result of the subsequent heating 125. The casingless sausage 144 is then chilled or cooled 135 with the chiller 130, thereby forming the casingless sausage product 146.

The casingless sausage product 146 can be formed into various sizes, e.g., various lengths, widths, and diameters (if applicable)and shapes, such as squares, animals, alphabets, and other desired shapes. For example, the system 100 can include a cutter 150 to cut 155 the casingless sausage product 146 into predetermined lengths or sections 148 having, for example, lengths from about 1" to about 6". Further, the casingless sausage product 146 can have various widths, for example, from about 0.5" to about 4". If the casingless sausage product 146 is circular or cylindrical, then its diameter can be, for example, from about 0.5" to about 4". Non-cylindrical sausage products 146 can also be formed with various shapes and dimensions. The cut lengths or sections 148 can be sent to a packager or canner 150 that packs 155 the cut sausage products 148 for storage, distribution, and future consumption. The cutter 140 and canner 150 can also be combined in a single cutting/canning unit, as shown in FIG. 1.

Figure 2:
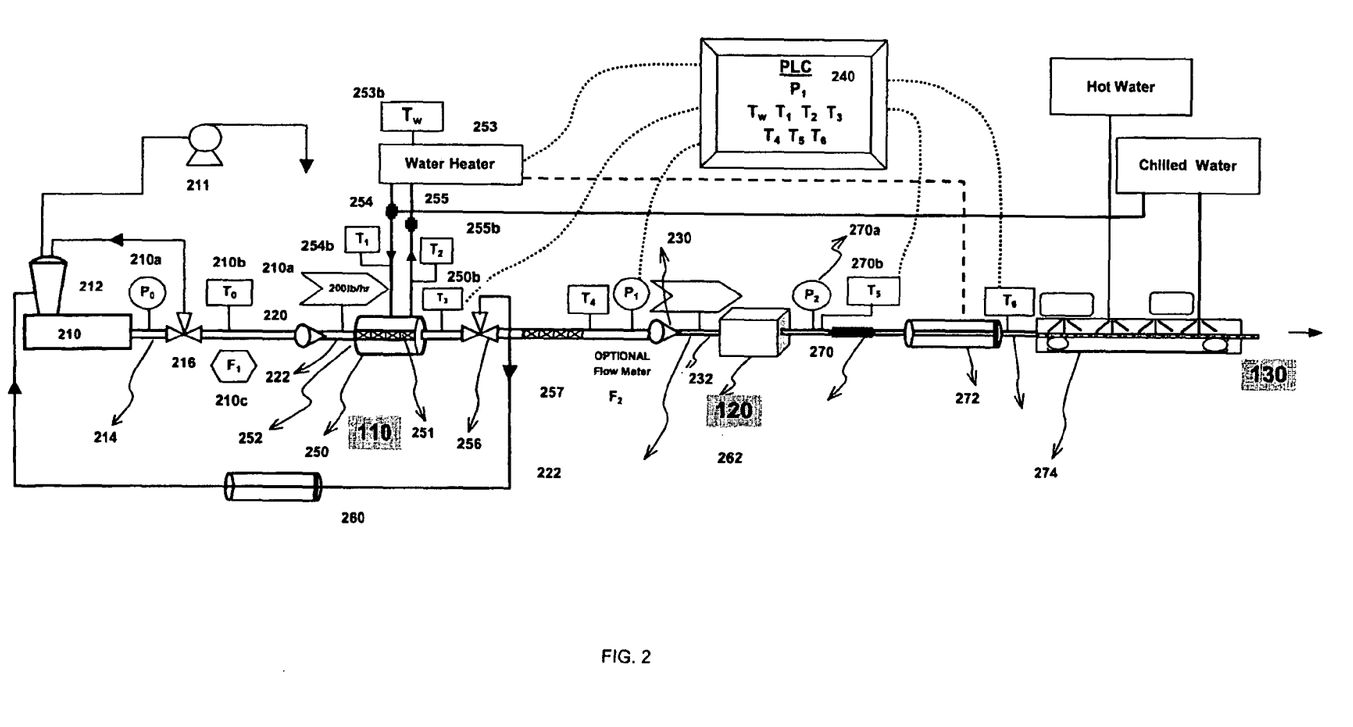
FIG. 2 is a schematic showing an implementation of a small-scale system in accordance with the present invention.

Having described the components of one embodiment of a dual-stage heating system 100 according to the present invention, FIG. 2 illustrates a small-scale system 200 according to a specific implementation of the present invention. The principles and techniques of the small-scale system 200 can be applied to larger-scale production systems by adjusting the operating parameters and equipment capabilities and configurations as appropriate, for example, by adjusting the operating parameters on a substantially linear basis or model to produce a larger-scale system. Indeed, other operating parameters and models may be suitable with different larger-scale system configurations, and the linear model is provided for purposes of illustration and explanation.

Referring to FIG. 2, a small-scale system 200 according to the present invention includes a pump 210, a first reducing element 220, a first heating element 110, a second reducing element 230, a second heating element 120, and a chiller 130. The system 200 can also include a monitor or controller 240, such as a processor, micro-controller, sensor, thermocouple, or programmable logic controller (PLC) for monitoring or controlling various temperatures, pressures and flow rates within the system 200.

The emulsion 140 is introduced into a hopper 212 that provides the emulsion 140 to the pump 210, which may be driven by a vacuum pump 211. In this exemplary small-scale system 200, the pressure $P_0$ 210a of the emulsion 140 exiting the pump 210 can be from about 50 psi to about 250 psi, the first temperature $T_0$ 210b of the emulsion 140, such as a refrigerated or storage temperature, can be from about 40° F. to about 60° F., and the flow rate $F_1$ 210c can be from about 100 lb/hr to about 300 lb/hr.

The emulsion 140 exits the pump 210 and is carried through a conduit 214 or conduit section. Various conduits 214 can be utilized to carry the emulsion 140, including food-grade tubes and non-cylindrical conduits.

If necessary, a portion or all of the emulsion 140 can routed to back to the hopper 212 through a valve 216 to bypass other parts of the system 200. For example, the emulsion 140 can be re-directed to the hopper 212 if the pressure P0 210a or the temperature $T_0$ 210b of the emulsion 140 are not within a desired range or if one or more downstream system 200 components are being repaired or undergoing maintenance. Thus, the emulsion 140 can circulate through the valve 216 and back to the hopper 212 and pump 210 until the condition is corrected or the repair or maintenance is completed.

The tube 214 continues to the first reducing element 220, which reduces the diameter of the tube 214 to a smaller diameter or a second tube 222 having a smaller diameter. For example, in one embodiment of the small-scale system 200, the first tube 214 has a diameter of about 4", and the second tube 222 has a diameter of about 1". As a result, the size or diameter of the emulsion 140 body is reduced to the diameter of the second tube 222. Further, in this exemplary small-scale system 200, the flow rate $F_2$ 210a of the emulsion 140 can be from about 150 lb/hr to about 450 lb/hr before the first reducing element 220 and from about 200 lb/hr to about 400 lb/hr after the first reducing element 220, more preferably from about 160 lb/hr to about 300 lb/hr, and even more preferably to about 200 lb/hr. In an alternative embodiment, the first tube has a diameter of about 2", and the second tube 222 has a diameter of about 1".

The emulsion 140 is provided through the smaller tube 222 to the first heating element 110 for initial heating 115 from the first temperature to an initial heating temperature. More specifically, during initial heating 115, the emulsion 140 is heated from the first temperature to an elevated temperature to produce a warm paste or emulsion 142. The emulsion 140, however, is not heated so much that it is completely cooked or hardened. In other words, the material property of the emulsion 140 is not changed and is preferably heated for a suitable time and at a suitable rate and temperature so that protein in the emulsion 140 does not coagulate or significantly coagulate.

Various first heating elements 110 can be utilized with the present invention. The first heating element 110, however, preferably is a heating element other than a rapid heating element (microwave or radio frequency (RF) rapid heating element). In one embodiment, the first heating element 110 is a conductive heating element, such as a heat exchanger 250. Various commercially available heat exchangers can be utilized, e.g., a Votator, Triple Tube heat Exchanger available from Waukesha Cherry-Burrell, 611 Sugar Creek Road, Delevan, Wis. heat exchangers available from Komax Systems, Inc., Wilmington, Calif. In an alternative embodiment, the first heating element may be a direct heating element, such as direct steam or hot water.

In the depicted embodiment, the heat exchanger 250 is a "tube-in-tube" heat exchanger. In this exemplary heat exchanger 250, the emulsion 140 passes through an inner tubular chamber 251 with a static mixer. Hot water is passed through the outer cylindrical chamber 252 that is coaxial with the tubular inner chamber 251. Water from a water heater 253 is circuited through lines 254 and 255 and through the heat exchanger 250.

In a specific implementation, the surface area of the inner tubular chamber 251 should be able to heat the emulsion 140 from its first temperature (such as a refrigerated or storage temperature of about 40° F.) to the initial heating temperature, e.g., a sub-de-naturization temperature. Preferably, the initial heating temperature is less than about 120° F., more preferably between from about 40° F. to 120° F., even more preferably between about 70° F. to 120° F., and even more preferably between about 90° F. to 100° F.

The temperatures Tw 253b, T1 254b and T2 255b of water in the water heater 253, inlet line 254 and outlet line 255, respectively, can be selected depending on the particular heat exchanger 250 utilized and desired initial heating 115 effect. For example, to achieve initial heating temperatures within the previously recited exemplary ranges, the temperature of the water T1 254b passing through the outer cylindrical chamber 252 preferably ranges from about 145° F. to about 200° F. Initial heating 115 times can vary depending on the initial heating temperature and other parameters, but in this specific implementation, the initial heating times can range from about 5 to about 30 seconds. Persons of ordinary skill in the art will recognize that other suitable initial heating temperatures, times, and forms of initial heating 115 can be used for smaller or larger systems, so long as protein in the emulsion 140 is not denatured.

The first heating element 110 preferably heats the emulsion 140 to form a warm emulsion or paste 142, and initial heating 115 of the emulsion 140 reduces the energy and cost requirements for the subsequent or second heating 125, which typically requires more energy than other forms of heating. Thus, by reducing or eliminating rapid heating or other heating systems that require significant energy, the present invention reduces energy costs, thereby enabling the production of sausages in a more cost and energy effective manner.

In the depicted embodiment 200, the initial heating temperature $T_3$ 250a of the warmed emulsion 142 exiting the first heating element 110 is preferably less than about 120° F., e.g., about 90° F. to 100° F. If necessary, part of the warmed emulsion 142 can be re-directed from the heat exchanger 250 through a valve 256 to a return chiller 260 back to the hopper 212. This may be desirable if, for example, one or more of the downstream system components are undergoing repair or maintenance. The chiller 260 is cooled with water from, for example, a water chiller 262. Cooling the re-circulated warmed emulsion 142 reduces or eliminates protein coagulation, thus making the emulsion more flowable. This enables the emulsion from 210 to enter the heat exchanger 250 with constant temperature range of about 40° F. to 60° F. Re-circulating the emulsion also minimizes product loss.

The warmed meat emulsion 142 exits the heat exchanger 250 after initial heating into a mixer 257, such as a line static mixer. The lined static mixer 257 can include a Teflon® inner lining to ensure that the warmed emulsion 142 remains heated and provides additional mixing. The warmed emulsion 142 passes through the mixer 257 and to the second reducing element 230.

The second reducing element 230 reduces the size of the initially heated emulsion 142 in the tube 222 (or other tube section 222) having, for example, an initial diameter of about 1" to a smaller tube 232 having a diameter of about 0.25" to about 0.95". Various tube 232 diameters can be utilized depending on the desired size of the final casingless sausage product. For example, if a Vienna sausage product is to be produced, the diameter of the final product preferably ranges from about 15 mm (0.59") to about 30 mm (1.18"), more preferably about 20 mm (0.75"). The dimensions of the tube 232 can be selected to produce a sausage product having these dimensions. As a result of the second reducing element 230, the flow rate 230c of the warmed emulsion 142 can be from about 15 ft/min to about 35 ft/min, preferably about 10 to 40 ft/min, preferably about 19 ft/min to about 21 ft/min.

The warmed emulsion 142 is then provided to the second heating element 120, which heats the emulsion 142 from the initial heating temperature to a second heating temperature. Various second heating elements 120 can be utilized with the present invention including, but not limited to, rapid heating elements. Exemplary rapid heating elements include microwave and RF energy elements.

Figure 3:
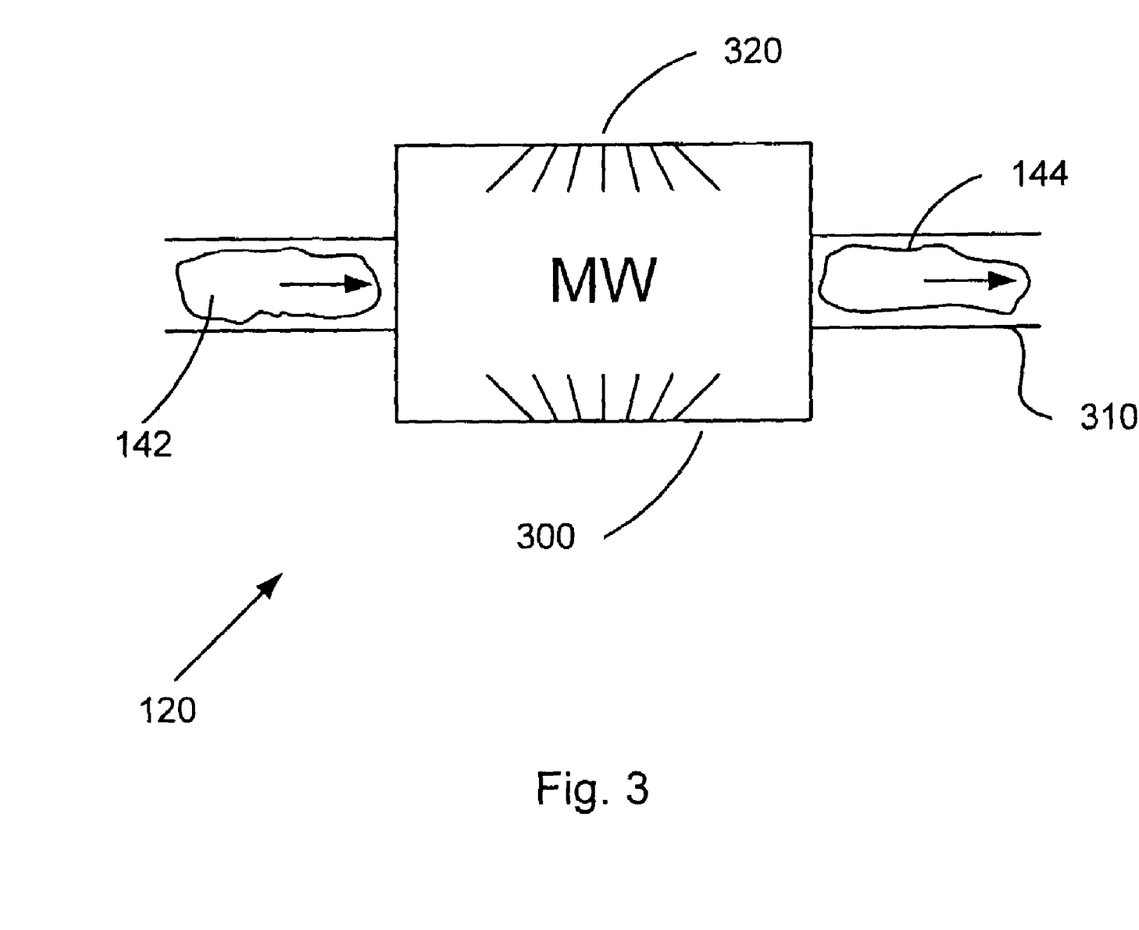
FIG. 3 illustrates an exemplary second heating element.

Referring to FIG. 3, in one embodiment, the second heating element 120 is a microwave heating element 300. A tube 310 passes through a microwave source 320. The tube 310 can be a Teflon®, porcelain or ceramic tube that allows rapid dielectric heating within the microwave source 320. Thus, while the warmed emulsion 142 passes through the tube 310, rapid heating denatures protein in the warmed emulsion 142 and toughens the warmed emulsion 142 to form a casingless sausage 144. Preferably, the warmed emulsion 142 is subjected to rapid heating to a second heating or final temperature ranging from about 130° F. to about 170° F., as the warmed emulsion 142 passes through the reduced tube e10 at a rate from about 0.5 ft/min to about 50 ft/min. The flow rate and second heating temperatures can change depending on the initial heating temperature 115 of the warm emulsion 140 and the power of the rapid heating or second heating element 120.

The warmed emulsion 142 is formed into a hardened casingless sausage 144 as a result of the second, subsequent heating 125. Because the emulsion 140 is initially heated 115 before it is subjected to a rapid heating or other second heating element 120, the amount energy required to cook and denature the protein in the emulsion to produce the hardened casingless sausage 144 is significantly reduced compared to systems that heat the meat emulsion using only rapid heating sources. As a result, casingless sausage 144 can be produced more efficiently with reduced costs with the present invention.

Figure 4:
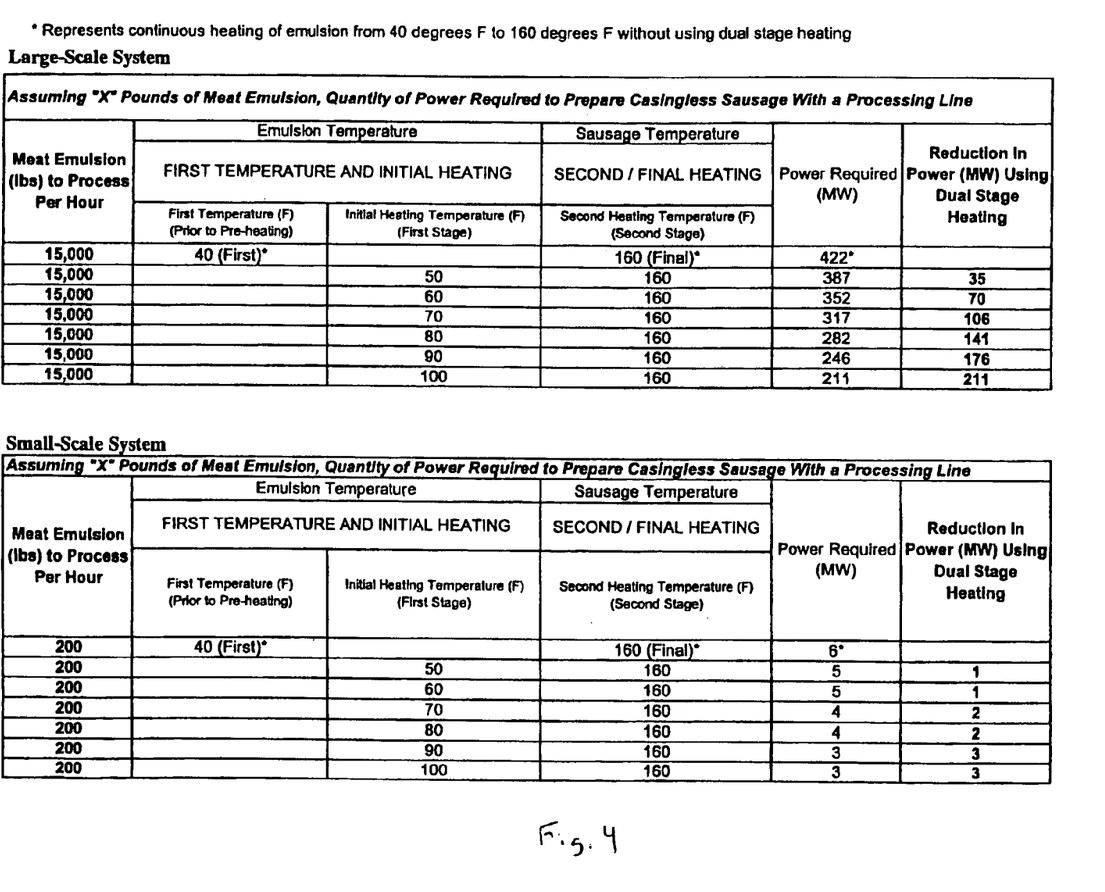
FIG. 4 is a chart illustrating savings in power utilizing the present invention.

The benefits of utilizing a first heating element 110 to process different amounts of sausage according to the present invention are summarized in FIG. 4. Specifically, FIG. 4 illustrates operating parameters of a small-scale 6 kW system (as shown in FIG. 2) and a larger-scale 422 kW system. The operating parameters and power savings of the larger-scale system are based on the operating parameters and energy savings realized using the smaller-scale system.

The exemplary small-scale system 200 utilizes a 5 kW rapid heating source, such as microwave, as the second heating element 120. The exemplary larger-scale system utilizes a 422 kW of microwave rapid heating element to produce larger quantities of casingless sausage, based on the principles and techniques of the smaller-scale system. For example, the operating parameters for the larger-scale 422 kW system can be based on a substantially linear relationship relative to the operating parameters of the smaller 6 kW system. Specifically, the relationship between the initial heating and the power savings may be substantially linear. Persons of ordinary skill in the art, however, will recognize that operating parameters may vary from the exemplary linear model for particular applications. Thus, other dual-stage heating systems according to the present invention may utilize parameters based on a linear or other model or relationship.

Specifically, FIG. 4 illustrates how initially heating 115 a meat emulsion 140 with a first heating element 110 from a first temperature to an initial heating temperature reduces the amount of power that is required to produce casingless sausage compared to system that use only a rapid heating microwave. For example, when the emulsion 140 is removed from a refrigerated or cooled storage environment (e.g., at a first temperature of about 40° F.) and heated continuously to 160° F. with a single, rapid heating source (a microwave source in this example) as in conventional systems, then 422 kW of rapid heating power is required to produce the casingless sausage.

When initial heating according to the present invention is utilized, the emulsion is initially heated from the first or storage temperature of about 40° F. to an elevated, initial heating temperature using a first heating element, for example, 70° F. as shown in FIG. 4. The microwave heating element is then used as a second heating element in the second heating stage to heat the warmed emulsion from the initial heating temperature of about 70° F. to a second heating temperature of about 160° F. to produce the casingless sausage. As shown in FIG. 4, the required microwave power to produce the casingless sausage is about 317 kW, which is less than the 422 kW required by a typical larger-scale conventional system. Thus, the initial heating reduces the required microwave energy by about 106 kW or about 25%.

As a further example, the emulsion is initially heated from a first temperature of about 40° F. to an initial heating temperature of about 90° F. with a first heating element. A second microwave heating element is then used to heat the warmed emulsion from the initial heating temperature of about 90° F. to a second heating temperature of about 160° F. to produce the casingless sausage. The required microwave power to produce the casingless sausage is about 246 kW, which is less than the 422 kW required by typical conventional systems. Thus, the dual stage heating according to the present invention reduces the required microwave energy by about 176 kW or about 60%.

Referring again to FIG. 2, after the second heating stage 125, the hot, semi-formed casingless sausage 144 passes through a probe 270. The probe measures the temperature $T_5$ 270b and the pressure $P_2$ 270a of the casingless sausage 144. The casingless sausage 144 is then held within an insulative member, such as a holding tube 272. An exemplary holding tube 272 is a tube with a heat exchanger, an extended Teflon® tube, or an insulated stainless steel tube. Preferably, the casingless sausage 144 is held in the holding tube 272 from about 10 seconds to about 120 seconds, to further harden the casingless sausage 144. During this holding period, the sausage 144 is preferably exposed to ambient air or water.

The casingless sausage 144 can then be rinsed or washed 274 with water to remove fat and oil, for example, using water at a temperature of about 120° F. The casingless sausage 144 is then cooled or chilled in a chiller 130 to form the final casingless sausage product 146. When entering the chiller 130, the temperature of the casingless sausage may be, for example, about 130° F. to about 150° F. For example, in the depicted embodiment, the casingless sausage 144 is preferably cooled from a temperature of about 130° F. to about 150° F. to a lower temperature ranging from about 30° F. to about 85° F., more preferably from about 35° F. to about 55° F., still more preferably about 50° F. At this stage, the temperature of the casingless sausage may cool to, for example, from about 120° F. to between 55° F. to 60° F. In a preferred embodiment, the chiller 130 includes a conveying belt on which the sausage product 146 is placed and passed under a chilled brine spray. The casingless sausage can also be exposed to an ambient condition, for example, for about 10 to about 120 seconds, to cool the sausage.

In an alternative embodiment, the continuous sausage product 146 is introduced into a chiller 130 in the form of a tube-in-tube heat exchanger. The inner tube of the heat exchanger can be made of any suitable material, such as plastic or stainless steel. Preferably the continuous sausage product 146 passes through an inner tube of the heat exchanger and cooling water is passed in an outer tube to cool the sausage. Because the sausage product 146 is casingless, however, it may be difficult to move through a tube as it cools because a solid film of fat remains on the sausage 146 surface. Fat acts as a lubricant when heated. Thus, the sausage product 146 can be partially chilled, e.g., to a temperature around 80° F., so that the fat continues to act as a lubricant. The sausage product 146 can then be subsequently further cooled on a conveying belt. In another alternative, an edible lubricant, such as vegetable oil, can be introduced onto the surface of the sausage 146 to facilitate movement inside the tube.

Following cooling 135 of the casingless sausage 144 to produce the casingless sausage product 146, the product 146 can be provided to a cutter 150 (not shown in FIG. 2) and cut 155 into predetermined lengths, such as from about 1" to about 6" and having a diameter from about 15 mm to about 30 mm to form casingless Vienna sausage products. The cut sausage products 148 can then be packaged, such as in cans, as is known in the art. Having described different system configurations and the manner in which a casingless sausage product is produced, following is a description of a method of producing such casingless sausage.

Figure 5:
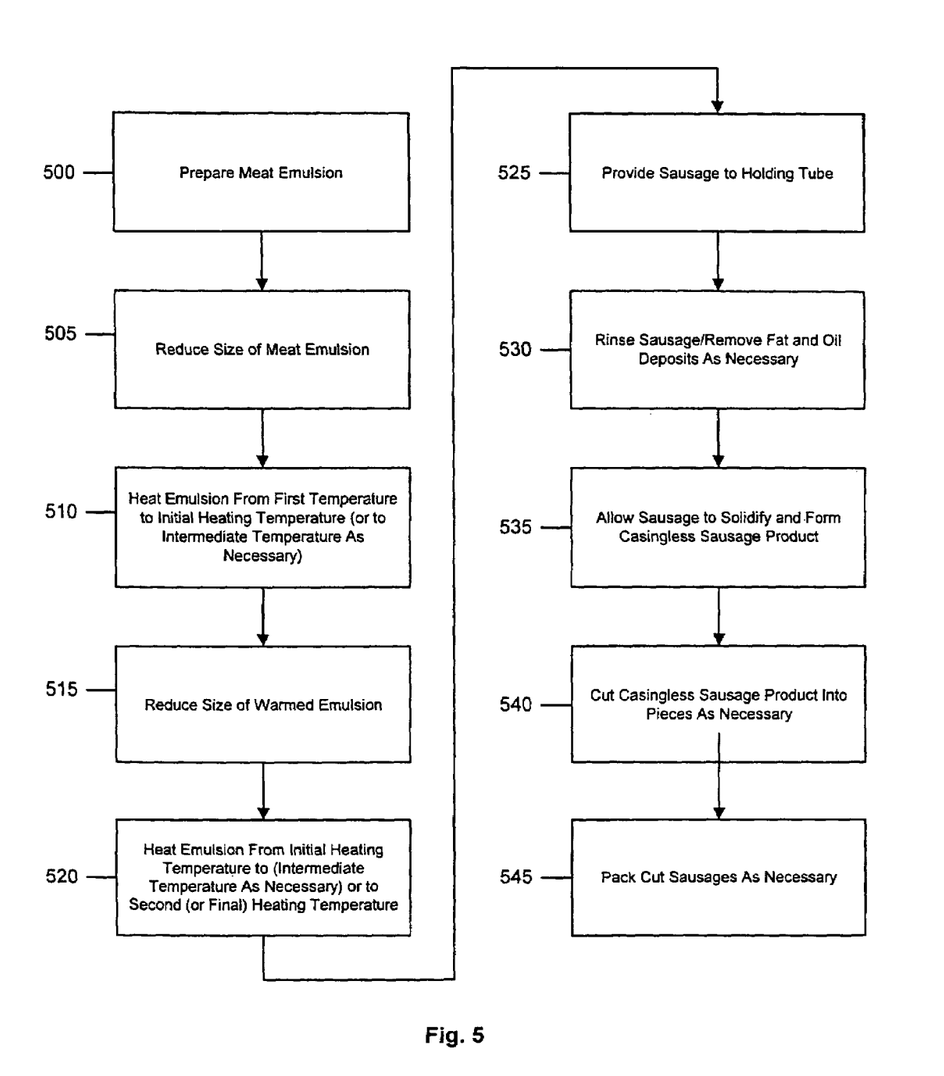
FIG. 5 is a flow chart illustrating a method of producing casingless sausage according to the present invention.

Referring to FIG. 5, in step 500, an emulsion, such as a blended meat emulsion or other food product emulsion, is prepared. In step 505, the emulsion is provided to a first reducing member, and the size of the meat emulsion is reduced using the first reducing member. In step 510, the reduced meat emulsion is initially heated from a first temperature to an initial heating temperature using a first heating element, preferably a heating element other than a rapid heating element. In alternative embodiments, the emulsion can be heated with the same heating element or with one or more additional heating elements to one or more intermediate heating temperatures between the first temperature and the initial heating temperature as necessary. For purposes of explanation, however, a dual-stage heating system is discussed, but the invention is not so limited. As a result, a warmed meat emulsion is produced. In step 515, the warmed meat emulsion is provided to a second reducing member and reduced in size using the second reducing member. In step 520, the warmed meat emulsion exiting the second reducing member is heated using a second heat element, for example, a rapid heating element, such as microwave or RF radiation, from the initial heating temperature to a second (or final) heating temperature. In alternative embodiments, the emulsion can be heated with the same heating element or with one or more additional heating elements to one or more intermediate heating temperatures between the initial heating temperature and the second (or final) temperature as necessary. For purposes of explanation, however, a dual-stage heating system is discussed, but the invention is not so limited. As a result, a casingless sausage is produced. In step 525, the casingless sausage is provided to a holding tube or other holding mechanisms to allow the sausage to partially solidify or become firmer as necessary. In step 530, the casingless sausage is rinsed or washed as necessary to remove excess fat or oil deposits. In step 535, the casingless sausage is permitted to set or solidify as necessary in, for example, a holding tube to form a casingless sausage product. In step 540, the casingless sausage product is cut to a predetermined length as necessary. In step 545, the cut sausages are packed or canned as necessary.

Having described a system and method according to the present invention, persons of ordinary skill in the art will appreciate that the principles and processing techniques described in connection with the smaller-scale system can be applied to larger-scale systems, for example, using a linear or other suitable model to adjust operating parameters as needed. Thus, although exemplary temperatures, pressures, and flow rates have been described for purposes of the smaller-scale system, persons of ordinary skill in the art will recognize that these parameters can be adjusted accordingly for use in larger-scale systems and with other food products.

Further, the present invention can be used to produce various types of food items including sausage, such as canned Vienna sausages. Additionally, various initial or first heating sources can be utilized to decrease the power that is otherwise consumed using only rapid heating elements. Different numbers of heating elements can also be utilized as necessary.

Although references have been made in the foregoing description to various embodiments, persons of ordinary skill in the art will recognize that insubstantial modifications, alterations, and substitutions can be made to the described embodiments without departing from the invention recited in the accompanying claims.

The invention claimed is:

1. A method for making a casingless sausage product comprising:
   providing an emulsion, a first heating element comprising a conductive heating element, and a second heating element,
   heating the emulsion initially with the first heating element from a first temperature to an initial heating temperature;
   heating the previously heated emulsion with the second heating element from the initial heating temperature to a second, higher heating temperature to cook the previously heated emulsion and to produce a casingless sausage;
   cooling the casingless sausage to produce the casingless sausage product; and
   cutting the casingless sausage product into individual sausages, cutting being performed after heating the emulsion with the first heating element and after heating the previously heated emulsion with the second heating element.

2. The method of claim 1, providing the emulsion further comprising providing an emulsion having meat.

3. The method of claim 1, providing the first heating element further comprising providing a heat exchanger.

4. The method of claim 1, heating the emulsion with the first heating element further comprising heating the emulsion to the initial heating temperature from the first temperature of about 40° F.

5. The method of claim 1, heating the emulsion with the first heating element further comprising heating the emulsion to an initial heating temperature that is less than about 120° F.

6. The method of claim 5, heating the emulsion with the first heating element further comprising heating the emulsion to an initial heating temperature from about 70° F. to about 100° F.

7. The method of claim 1, heating the emulsion with the first heating element further comprising heating the emulsion for about 5 seconds to about 30 seconds.

8. The method of claim 1, heating the previously heated emulsion further comprising heating the previously heated emulsion with a rapid heating element.

9. The method of claim 8, heating the previously heated emulsion with a rapid heating element further comprising heating the previously heated emulsion paste with a microwave source.

10. The method of claim 8, heating the previously heated emulsion with a rapid heating element further comprising heating the previously heated emulsion with radio frequency (RF) source.

11. The method of claim 1, heating the previously heated emulsion further comprising heating the previously heated emulsion to the second heating temperature that is from about 130° F. to about 170° F.

12. The method of claim 1, heating the previously heated emulsion to the second heating temperature with the second heating element further comprising heating the previously heated emulsion for about 2 to about 60 seconds.

13. The method of claim 1, cooling the casingless sausage further comprising passing the casingless sausage through a chiller after exiting the second heating element.

14. The method of claim 13, passing the casingless sausage through the chiller further comprising passing the casingless sausage under a chilled brine.

15. The method of claim 1, cooling the casingless sausage further comprising cooling the casingless sausage from the second heating temperature to a cooling temperature of about 85° F. to about 35° F.

16. The method of claim 15, cooling the casingless sausage further comprising cooling the casingless sausage to a cooling temperature of about 50° F.

17. The method of claim 1, further comprising exposing the casingless sausage to an ambient condition prior to cooling.

18. The method of claim 17, exposing the casingless sausage to an ambient condition further comprising exposing the casingless sausage to an ambient condition for about 10 to about 120 seconds.

19. The method of claim 1, further comprising reducing a size of a conduit that carries the emulsion to the first heating element.

20. The method of claim 19, reducing the size of the conduit further comprising reducing a diameter of a tube from about 4" to about 1".

21. The method of claim 20, the emulsion entering a larger end of the tube at about 200 lb/hour.

22. The method of claim 20, the emulsion exiting a reduced end of the tube at about 180 lb/hour.

23. The method of claim 1, further comprising reducing a size of a conduit that carries the previously heated emulsion from the first heating element to the second heating element.

24. The method of claim 23, reducing the size of the conduit further comprising reducing a diameter of a tube from about 1" to about 0.5".

25. The method of claim 24, the emulsion entering the larger end of the tube at about 200 lb/hour.

26. The method of claim 24, the emulsion exiting the reduced end of the tube at about 10 to about 40 ft/mm.

27. The method of claim 1, cutting the casingless sausage product further comprising cutting the casingless sausage product into lengths of about 1" to about 6".

28. The method of claim 27, the individual sausages having a diameter from about 6" to about 1.2".

29. The method of claim 1, prior to cooling, further comprising directing the casingless sausage through an insulative member.

30. The method of claim 1, prior to cooling, further comprising rinsing the casingless sausage.

31. A system for making a casingless sausage product from an emulsion comprising:
a first heating element, the first heating element comprising a conductive heating element;
a second heating element;
a chiller; and
a cutter,
the emulsion being initially heated with the first heating element from a first temperature to an initial heating temperature, then heated again from the initial heating temperature to a second, higher heating temperature with the second heating element to form a casingless sausage, the chiller producing the casingless sausage product from the casingless sausage from the second heating element, the cutter forming individual sausages from the casingless sausage product after the initial heating to the first temperature and the additional heating to the second temperature.

32. The system of claim 31, the first heating element comprising a heat exchanger.

33. The system of claim 31, the second heating element comprising a microwave source.

34. The system of claim 31, the second heating element comprising a radio frequency (RF) source.

35. The system of claim 31, the chiller applying chilled brine onto the casingless sausage.

36. The system of claim 31, the casingless sausage being exposed to an ambient condition prior to entering the chiller.

37. The system of claim 31, further comprising a pump that provides the emulsion to the first heating element.

38. The system of claim 31, further comprising a reducing element that reduces a size of a conduit carrying the emulsion from the pump to the first heating element.

39. The system of claim 38, the conduit comprising a tube, a diameter of the tube being reduced from about 4" to about 1" by the first reducing element.

40. The system of claim 39, the tube being configured so that the emulsion enters the larger end of the tube at about 200 lb/hour.

41. The system of claim 39, the tube being configured so that the emulsion exits the reduced end of the tube at about 10 ft/min to about 40 ft/min.

42. The system of claim 31, further comprising a reducing element that reduces a size of a conduit that carries the previously heated emulsion from the first heating element to the second heating element.

43. The system of claim 42, the conduit comprising a tube, a diameter of the tube being reduced from about 1" to about 0.5".

44. The system of claim 43, the tube being configured so that the previously heated emulsion enters the larger end of the tube at about 200 lb/hour.

45. The system of claim 44, the tube being configured so that the previously heated emulsion exits the reduced end of the tube at about 19 ft/min to about 21 ft/min.

46. A system for making a casingless sausage product from an emulsion comprising:
a first heating element, the first heating element comprising a direct heating element;
a second heating element;
a chiller; and
a cutter,
the emulsion being initially heated with the first heating element from a first temperature to an initial heating temperature, then heated again from the initial heating temperature to a second, higher heating temperature with the second heating element to form a casingless sausage, the chiller producing the casingless sausage product from the casingless sausage from the second heating element, the cutter forming individual sausages from the casingless sausage product after the initial heating to the first temperature and the additional heating to the second temperature.

47. The method of claim 1, heating the emulsion initially with the first heating element resulting in the emulsion being heated but not coagulated.

48. The method of claim 1, heating the emulsion initially with the first heating element resulting in the emulsion being initially heated and partially coagulated, but not completely coagulated.

49. The method of claim 1, the previously heated emulsion being completely coagulated during heating with the second heating element to produce the casingless sausage.

* * * * *